United States Patent [19]
Miura

[11] Patent Number: 5,982,473
[45] Date of Patent: Nov. 9, 1999

[54] IMAGE SCANNER

[75] Inventor: Hiroshi Miura, Toyohashi, Japan

[73] Assignee: Minolta Co., Ltd., Osaka, Japan

[21] Appl. No.: 08/751,395

[22] Filed: Nov. 20, 1996

[30] Foreign Application Priority Data

Nov. 22, 1995 [JP] Japan .................................. 7-304610

[51] Int. Cl.$^6$ ............................................... G03B 13/28
[52] U.S. Cl. ........................... 355/45; 355/69; 355/228; 355/214
[58] Field of Search ........................... 358/506; 348/112; 355/69

[56] References Cited

U.S. PATENT DOCUMENTS

| | | | |
|---|---|---|---|
| 4,339,183 | 7/1982 | Yamada et al. | 353/78 |
| 4,825,065 | 4/1989 | Imai | 250/205 |
| 4,970,556 | 11/1990 | Iwata | 355/214 |
| 5,424,804 | 6/1995 | Pultorak | 355/214 |

FOREIGN PATENT DOCUMENTS 60-145763  8/1985  Japan .

*Primary Examiner*—Georgia Epps
*Assistant Examiner*—Timothy J Thompson
*Attorney, Agent, or Firm*—Burns, Doane, Swecker & Mathis, LLP

[57] ABSTRACT

In an image reading method which executes a prescan to obtain optimum reading parameters for a main scan prior to a main scan for reading a document image, a document image is read by illuminating the document image by a specific exposure amount for the prescan and reading the document thereby, detecting the density of the document, and determining the exposure amount for illuminating said document in a main scan in accordance with the detected document density, and determining a wait time to delay the start of the main scan in accordance with the determined exposure amount of the main scan, then starting the reading of the document in a main scan after waiting the determined wait period.

15 Claims, 9 Drawing Sheets

Fig.8

| K | ... | -40 | -30 | -20 | -10 | 0 | 10 | 20 | 30 | 40 |
|---|---|---|---|---|---|---|---|---|---|---|
| exposure amount (%) | ... | 20 | 30 | 40 | 50 | 60 | 70 | 80 | 90 | 100 |

Fig.9

| exposure amount (%) | 100 | 90 | 80 | 70 | 60 | 50 | 40 | 30 | 20 | 10 |
|---|---|---|---|---|---|---|---|---|---|---|
| wait time (sec) | 0.3 | 0.2 | 0.1 | 0 | 0.1 | 0.2 | 0.3 | 0.4 | 0.5 | 0.6 |

IMAGE SCANNER

BACKGROUND OF THE INVENTION

1. Field of the Invention

The present invention relates to an image reading device and an image reading method, in particular, a device and a method for breaking down image information on a document into minute areas and reading said image information as electrical signals for use in microfilm scanners and the like.

2. Description of the Related Art

Microfilm reader/scanners, for example, are image reading devices which read document images such as image frames photographed on microfilm. Typically, in such microfilm reader/scanners, prescanning is executed to obtain optimum reading parameters (e.g., amount of exposure, variable magnification, and the like) prior to a main scan to read a document image. The main scan starts after a predetermined time has elapsed following the completion of the prescan.

That is, first a prescan is executed to determine whether the film image is a dark image or a bright image. If the film image is a dark image, the amount of light exposure (hereinafter referred to simply as "exposure amount") is set higher during the main scan, whereas if the film image is a bright image, the exposure amount is set lower during the main scan. The film image is then read (main scan), and the main scan is started after waiting for stabilization of the set exposure amount. If there is a large difference between the exposure amount during the prescan and the exposure amount during the main scan, much time is required for the main scan exposure amount to become stabilized, i.e., the time required to attain the main scan exposure amount. Therefore, conventionally, the greatest amount of exposure change is estimated between the prescan exposure amount and the main scan exposure amount to uniformly delay the start of the main scan. In this method, however, even when the amount of change in the exposure amount is small between the prescan and the main scan such that only a short time is required to attain the exposure amount of the main scan, the start of the main scan is delayed for the same amount of time as when the difference in the exposure amount is quite large, thereby unnecessarily delaying the start of the main scan.

Japanese Patent publication No. HEI 2-15146 (i.e., Japanese Laid-Open Patent Application No. SHO 60-145763) discloses a means for measuring the rate of change of the exposure amount of a light source (exposure change measuring means) to detect whether or not the exposure quantity is stabilized, so as to start the main scan after the exposure amount is stable. This device, however, is disadvantageous inasmuch as the requirement of providing an additional exposure change measuring means increases the number of components and increases the cost of the device.

OBJECTS AND SUMMARY

An object of the present invention is to provide an image reading device and an image reading method for reducing the total reading time without increasing the number of components in an image reading device for reading document images by executing a main scan after executing a prescan.

These objects are achieved by an image reading method which executes a prescan to obtain optimum image reading parameters for a main scan prior to the main scan for reading a document image. The image reading method comprises a first step of reading a document by illuminating the document image via a predetermined prescan exposure amount and detecting the density of said document, a second step of determining an exposure amount for the main scan for illuminating a document in accordance with the detected document density, a third step of determining the time for delaying the start of the main scan in accordance with the determined main scan light exposure, and a fourth step of starting the reading of the document in the main scan after waiting the determined delay time.

In the image reading method of the present invention, if the exposure amount of the prescan remains the same and the exposure amount set for the main scan remains the same, the time from the setting of the exposure amount of the main scan until the exposure amount is stabilized, i.e., the time required to attain a predetermined exposure amount for the main scan determined (set) by a specific method from a predetermined prescan exposure amount, can be expected to be the same for each exposure cycle. That is, the wait time required to attain a stable exposure amount can be expected to remain constant for each exposure cycle. Focusing on this point, the specific form (e.g., table, functional equation or the like) of the relationship between the previously set exposure amount of the prescan and the wait time required to attain the exposure amount of the main scan can be determined beforehand, such that the wait time required for stabilization of the exposure amount set for the main scan can be determined from said relationship, and the wait time can be reduced when the change in said exposure amounts is small by delaying the start of the main scan by only the determined wait time, thereby reducing the total image reading time.

The power supplied to the scanning light source may be modified in steps to change the aforesaid exposure amount. The exposure amount can be modified with relative ease by changing the power supplied to the light source.

These objects are achieved by an image reading device which executes a main scan after executing a prescan of a document image to obtain optimum image reading parameters for the main scan. The image reading device comprises a light source for illuminating a document by emitting a predetermined set exposure amount, photoelectric conversion elements for receiving reflected light from a document illuminated by said light source and converting and outputting the optical signals as electric signals, a density detection unit for outputting document density based on the electric signals output from said photoelectric conversion elements, an exposure amount control unit for setting an exposure amount for a main scan in accordance with a density detected by said density detection unit so as to change the exposure amount of said light source, and a delay control unit for setting the wait time from the end of a prescan until the start of a main scan in accordance with the exposure amount determined by said exposure amount control unit.

In an image reading device of the aforesaid construction, because the wait time is determined in accordance with an exposure amount set for a main scan and the main scan is started after a delay of only said determined wait time, the wait time changes in accordance with the exposure amount, thereby allowing the total reading time to be shortened. Furthermore, it is unnecessary to provide a separate means to measure the rate of change of the exposure amount, thereby avoiding an increase in the number of components and a concomitant increase in cost.

It is desirable that the previously mentioned prescan by accomplished by a predetermined exposure amount set beforehand. Thus, the exposure amount of a main scan can be readily determined.

The previously mentioned exposure amount control unit may store beforehand tables showing the relationship between detected density information and exposure information corresponding to said density information, so as to determine exposure amounts based on said table. Exposure amounts can be instantly determined by means of such a construction.

The previously mentioned delay control unit may store functional equations beforehand to determine the wait time by substitution of a determined exposure amount. The memory storage capacity can be minimized to the lowest limit by means of such a construction.

The previously mentioned light source is desirably changed to an exposure amount set for a main scan without being turned OFF after a prescan. Thus, the exposure amount for a main scan can be quickly stabilized.

The aforesaid light source may comprise a light-emitting lamp and a power source for supplying power to said lamp, such that the exposure amount of the lamp can be controlled by controlling the supplied voltage from said power source. The exposure amount can be modified with relative ease by changing the power supplied to the light source by means of such a construction.

The previously mentioned density detection means may detect image density by generating a histogram of the accumulation of each level of brightness of digital image signals output from the photoelectric conversion elements during a prescan. Accurate density detection can be accomplished by means of such a construction.

The aforesaid objects can be further achieved by the microfilm reader/scanner described below. A microfilm reader/scanner comprising a reader optical unit for projecting a document image recorded on film onto a screen, and a scanning optical unit for reading said document image and converting the read image to electric signals, said microfilm reader/scanner further comprising a light source which emits a predetermined set exposure amount to illuminate a document image recorded on a film, mirrors for bending the document reflected light to said reader optical unit and said scanner optical unit, a screen on which is projected a document image recorded on film illuminated by said light source, wherein said scanning optical unit converts an image read in a main scan to electric signals after executing a prescan to obtain optimum image reading parameters, and further comprises photoelectric conversion elements for receiving reflected light of the document image illuminated by said light source and converting and outputting optical signals as electric signals, and a controller for detecting a document density based on the electric signals output from said photoelectric conversion elements, determining an exposure amount for a main scan in accordance with a detected density and changing said exposure amount of the light source in conjunction therewith, and extending the wait time after a prescan in accordance with the exposure amount of a main scan before starting said main scan.

The microfilm reader/scanner of the aforesaid construction determines a wait time in accordance with an exposure amount determined for a main scan, and starts a main scan after waiting only said determined wait time, so as to reduce the total image reading time by changing the wait time in accordance with the exposure amount.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIG. 8 is a table showing an example of the exposure amount (%) relative to the value of K;

FIG. 9 is a table of exemplary wait times relative to the exposure amount (%);

DESCRIPTION OF THE PREFERRED EMBODIMENTS

The preferred embodiments of the present invention are described hereinafter with reference to the accompanying drawings. In the following description, the present invention is presented in terms of its application to a microfilm reader/scanner. The microfilm reader/scanner (hereinafter referred to as "reader/scanner") is a device for reading document images recorded on film.

Figure 1:
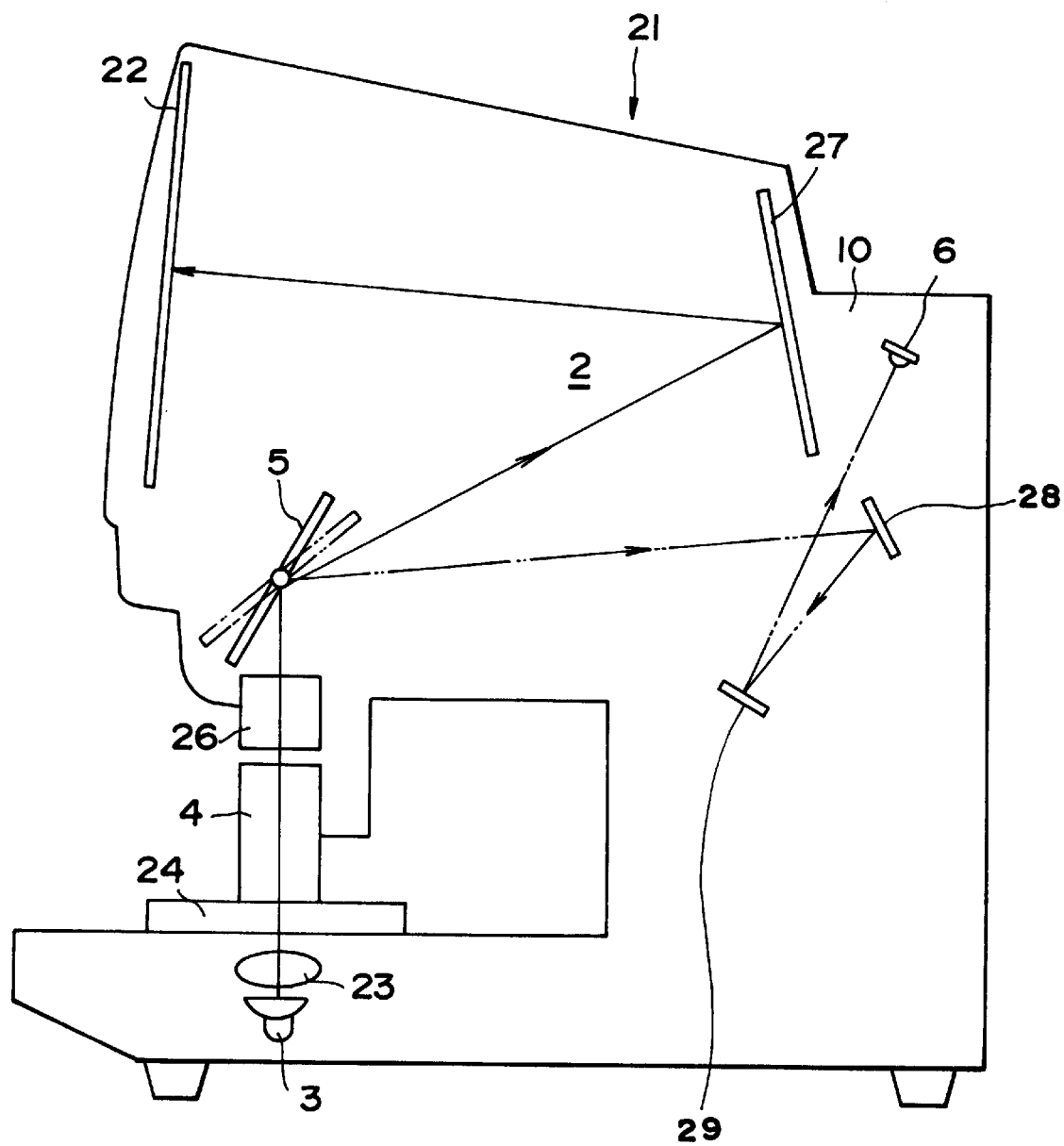
FIG. 1 is a section view of a microfilm reader/scanner of an embodiment of the image reading device of the present invention.
Figure 2:
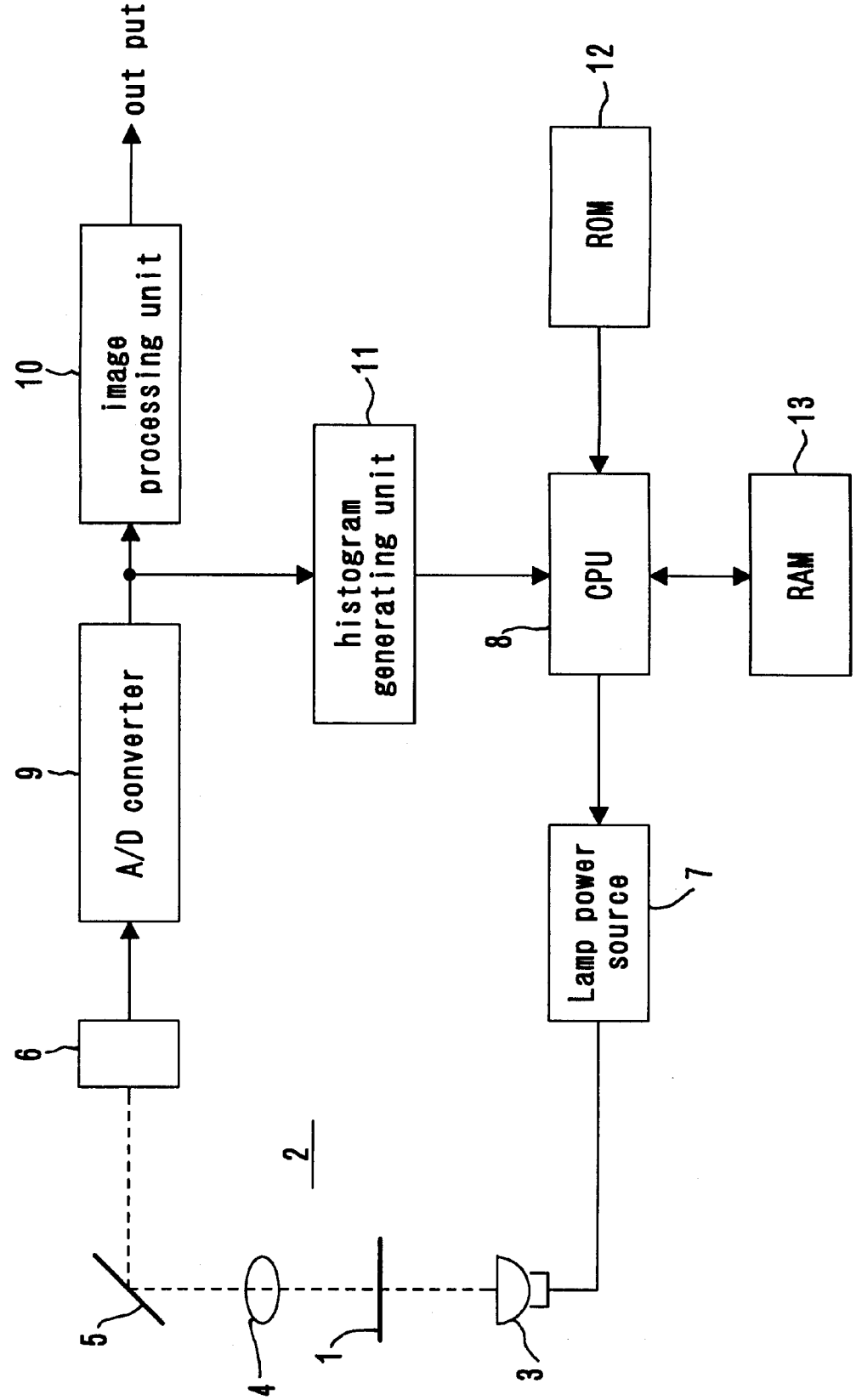
FIG. 2 shows the construction of portions of the microfilm reader/scanner of the present invention shown in FIG. 1.

FIG. 1 shows a section view of a reader/scanner as an embodiment of the image reading device of the present invention, and FIG. 2 briefly shows the construction of portions of the reader/scanner.

Reader/scanner 21 comprises a screen 22, charge-coupled device (CCD) line sensor 6, and an optical unit 2 for projecting an image to said CCD sensor and screen, and is capable of projecting onto a screen 22 the image recorded on microfilm (hereinafter referred to simply as "film") 1 set on a carrier 24 for viewing, and electrically reading an image projected onto CCD line sensor 6. Below film 1 set on carrier 24 are arranged a light source lamp (e.g., a halogen lamp) 3, and a condenser lens 23 to focus the light emitted form said lamp 3. Above film 1 set on carrier 24 are arranged a projection lens 4, prism 26 for rotating a projected image, and a scanning mirror 5, as well as a first mirror 27 for projecting an image onto screen 22. Scanning mirror 5 oscillates, and second mirrors 28 and 29 are arranged to project an image onto CCD line sensor 6. Reader/scanner 21 is also provided with an optical unit 2 for projection onto screen 22, and lamp 3 is lighted while the power source is turned ON.

When reading an image on film 1, light emitted by lamp 3 is condensed by condenser lens 23 and illuminates film 1, and the light passing through film 1 passes through projection lens 4, is reflected by scanning mirror 5 and the like, and forms an image on CCD line sensor 6. The film image is scanned (subscan) in a direction perpendicular to the direction (main scan) of CCD line sensor 6 via scanning mirror 5 disposed in the optical path. The subscan is not restricted to scanning mirror 5, and may be accomplished by moving CCD line sensor 6.

CCD line sensor 6 may have, for example, 4,800 individual sensors (photoelectric conversion elements) arranged in a straight line, which convert and output the amount of illumination light (i.e., the amount of light transmitted through the film) to voltages via said sensors. The film transmittance light forms an image on CCD line sensor 6, and the brightness of one line recorded on film 1 is converted to 4,800 individual voltages. For example, the voltage is low when the image is bright, and the voltage is high when the image is dark.

The lamp light source 3 is connected to a lamp power source 7. Lamp power source 7 outputs a voltage to lamp 3 to light said lamp 3. The output voltage of lamp power source 7 is controlled via instructions from central processing unit (CPU) 8. CPU 8 specifies the percentage of output voltage relative to a maximum voltage of lamp power source 7. For example, when a voltage ratio of 60% is specified, the voltage output of lamp power source 7 is set at 60% of a maximum voltage. Since CPU 8 controls the exposure amount of lamp 3 by specifying the voltage ratio, the specified voltage ratio is referred to as "exposure percentage (%)," to realize setting the setting of the voltage ratio as setting the exposure amount of lamp power source 7.

An analog-to-digital (A/D) converter 9 is connected to CCD line sensor 6. A/D converter 9 converts voltages output from CCD line sensor 6 to, for example, 8-bit digital values. More specifically, there are 256 divisions between specific upper limit and lower limit voltages, and an input analog voltage corresponds to one of said intervals, such that the digital value of said corresponding interval is output. For example, the lowest voltage (brightest) may be [0], and the highest voltage (darkest) may be [255].

A digital image output from A/D converter 9 is selectively transmitted to either image processing unit 10 or histogram generating unit 11. Image processing unit 10 is selected for the main scan, whereas the histogram generating unit 11 is selected for the prescan.

Image processing unit 10 executes image processes such as edge highlighting, masking, binarization, and the like, relative to digital images input from A/D converter 9 during the main scan, and outputs the processed image data to external devices (e.g., laser beam printer, or the like).

Histogram generating unit 11 functions as a document density detecting means, and generates a histogram from input digital image signals transmitted from the A/D converter 9 during the prescan. These image signals are 8-bit signals, and are level values describing the brightness of pixels expressed in numbers from 0 to 255. Histogram generation is accomplished by increasing by 1 the frequency of a level corresponding to each pixel input (i.e., incrementing the corresponding value in memory by 1), and repeating the operation. The histogram generated by the histogram generator unit 11 is read by CPU 8 to supply the exposure amount settings of the main scan.

Figure 3:
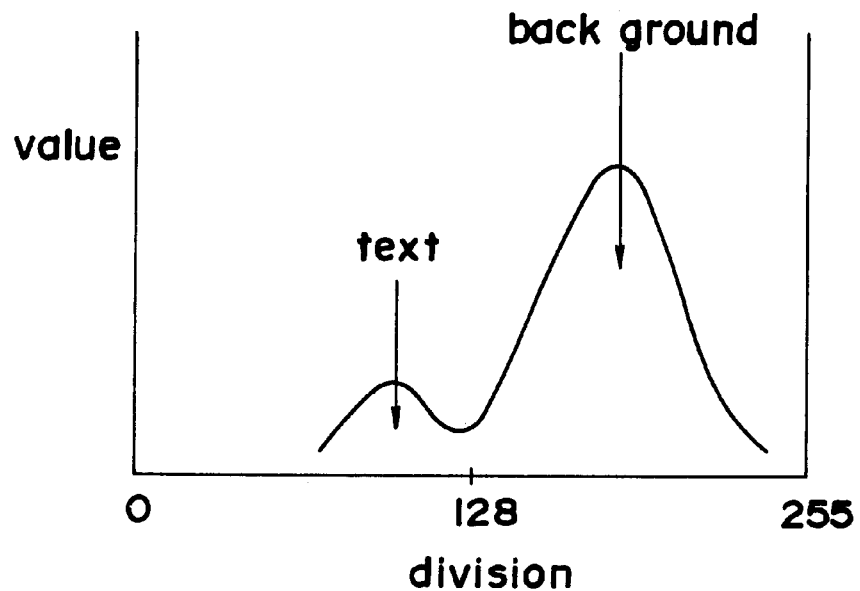
FIG. 3 shows an example of a histogram.
Figure 4:
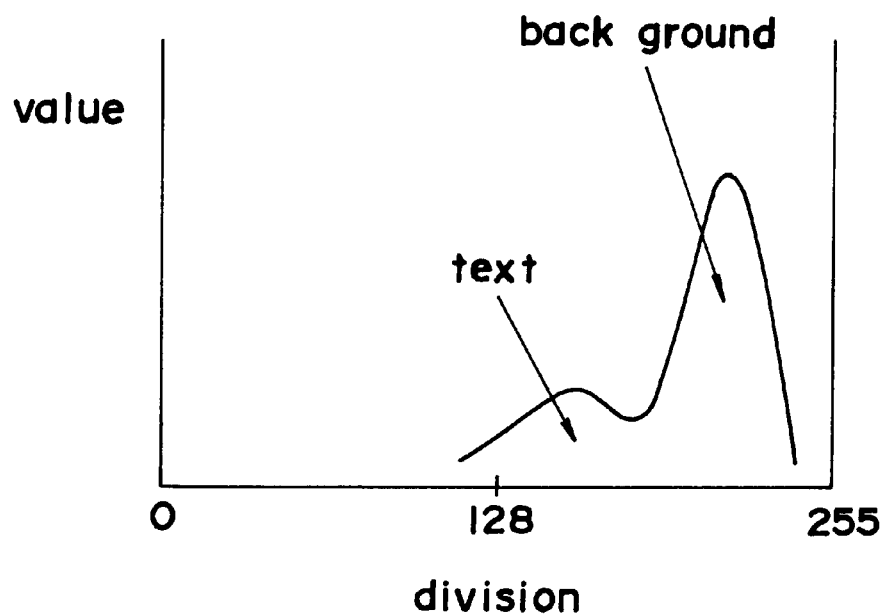
FIG. 4 shows another example of a histogram.

In the case of a negative image, for example, the histogram may appear as shown in FIG. 3. The background level values peak on the larger side (right side) because the background is dark, whereas the text level values have a small peak on the left side because the text is bright. For example, 128 is compared to the image data as a threshold value, such that when the image data are larger than the threshold value said image data are binarized as white color background, and when the image data are less than said threshold value, said image data are binarized as black color text. In contrast, the histogram shown in FIG. 4 has both peaks biased to the right side of the threshold value due to the darkness of film 1. Thus, the exposure amount of the prescan is maintained during the main scan, the obtained image data are binarized, and the text is erased. The lamp 3 is made brighter during the main scan than during the prescan based on the amount of deviation toward the right. This effectively moves the peak toward the left. The method of determining the exposure amount of the main scan based on the histogram is described later.

The CPU 8 functions as an exposure amount determining means, a wait time determining means, and a control means, and more specifically is provided with a function for controlling the scanning by scanning mirror 5 and setting the exposure amount of lamp power source 7 during the prescan and during the main scan, a function for determining the exposure amount for the main scan based on a histogram generated by histogram generating unit 11, a function for determining the wait time for starting the main scan based on the determined exposure amount for the main scan, and a function for delaying the main scan by only the determined wait time and like functions. The contents of each of these functions are described later. Connected to CPU 8 are ROM 12 which is a read only memory, and RAM 13 which is a reading/interrupt memory. Programs and tables described later are stored in ROM 12, and intermediate result data under processing, and process result data for output are stored in RAM 13.

Figure 5:
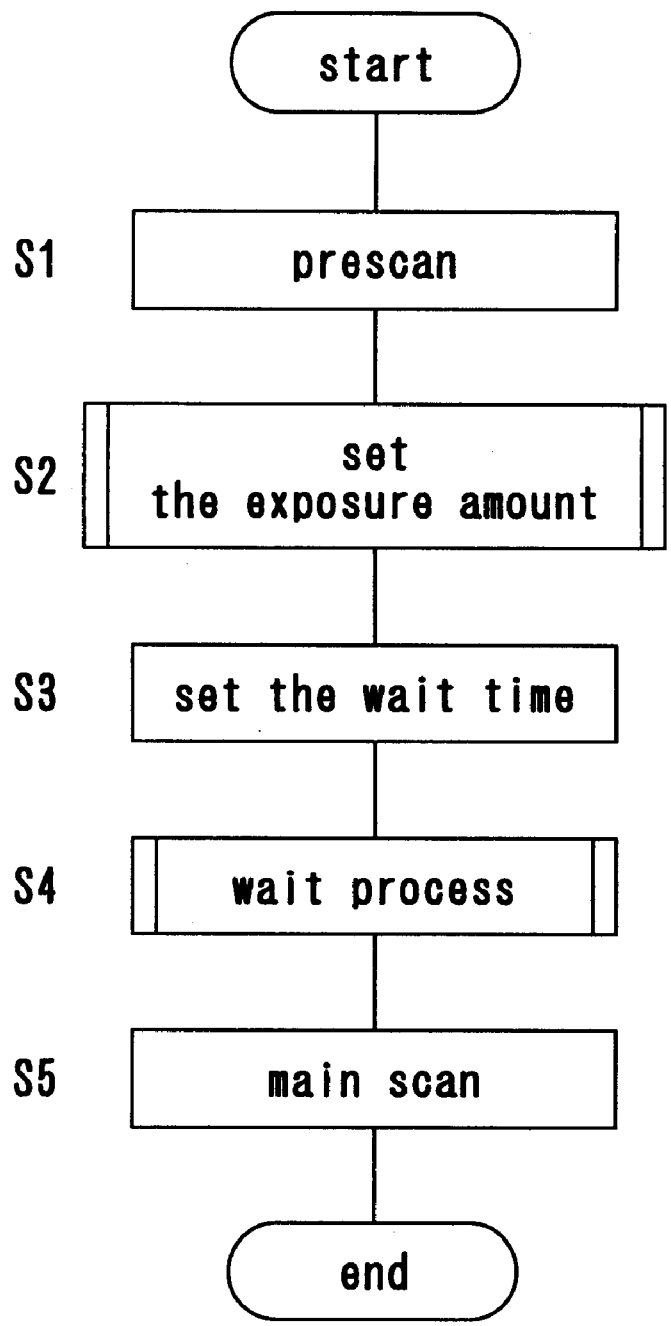
FIG. 5 is a main flow chart of the operation of the reader/scanner of FIG. 1.

FIG. 5 is a main flow chart showing the image reading operation of the reader/scanner of the previously described construction. The operations accomplished by this reader/scanner are controlled by CPU 8.

First, in step S1, a prescan is executed at a constant lamp exposure amount for the prescan, and the image is scanned by scanning mirror 5. The voltages (image signals) output from CCD line sensor 6 in conjunction with the scanning by scanning mirror 5 are digitized as 8-bit image data by A/D converter 9. These image data are not output, but rather are input to histogram generating unit 11 and used to create a histogram (refer to FIGS. 3 and 4).

Figure 6:
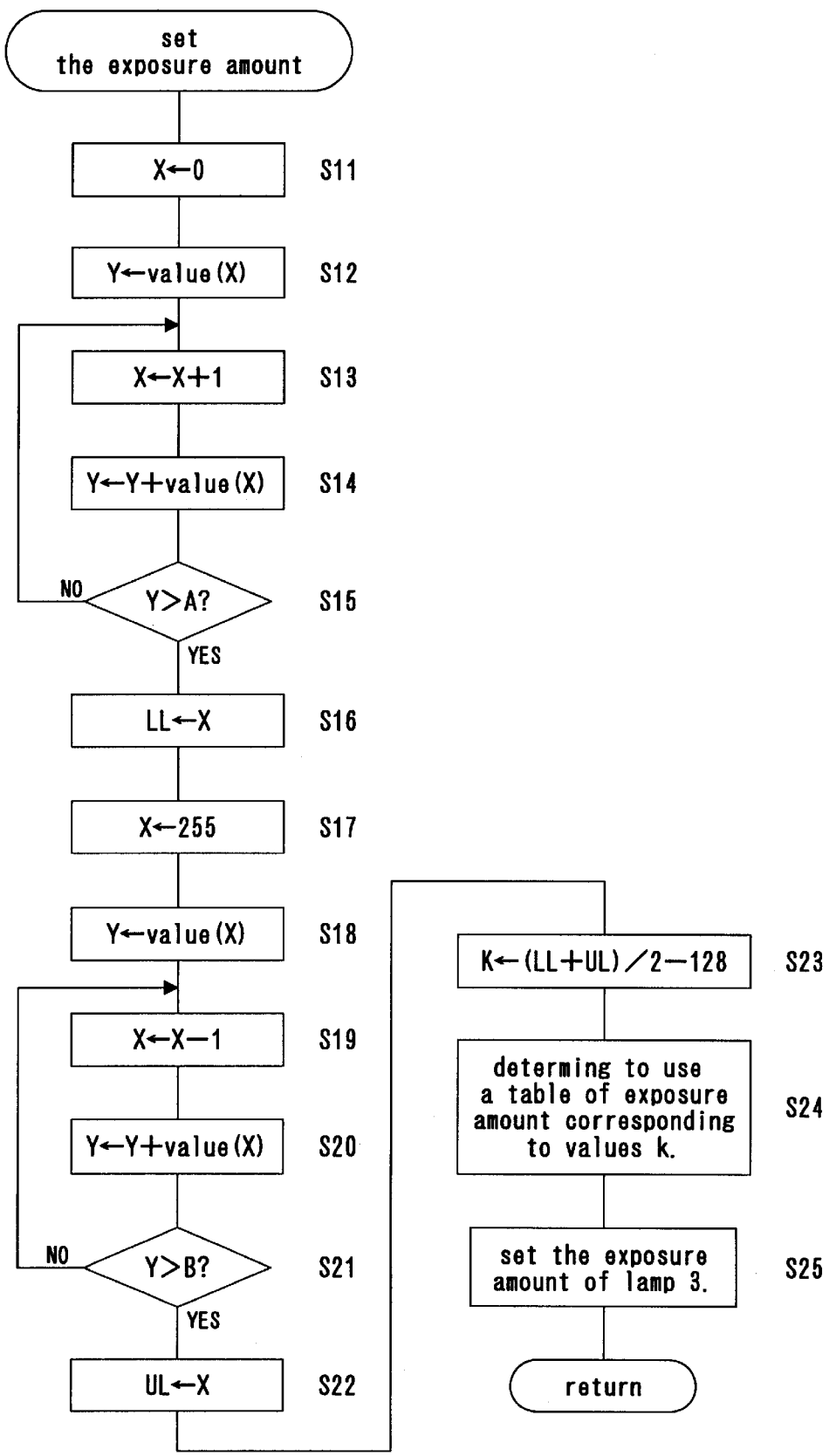
FIG. 6 is a flow chart showing the exposure setting process of FIG. 5.

In step S2, when the prescan has ended, CPU 8 reads the histogram created by histogram generating unit 11, and determines and sets the exposure amount of the main scan based on said histogram. Details of the process are described below with reference to FIGS. 6 and 7. FIG. 6 is a flow chart of the operation of the exposure setting process, and FIG. 7 is an illustration used in conjunction with the description of FIG. 6.

Figure 7:
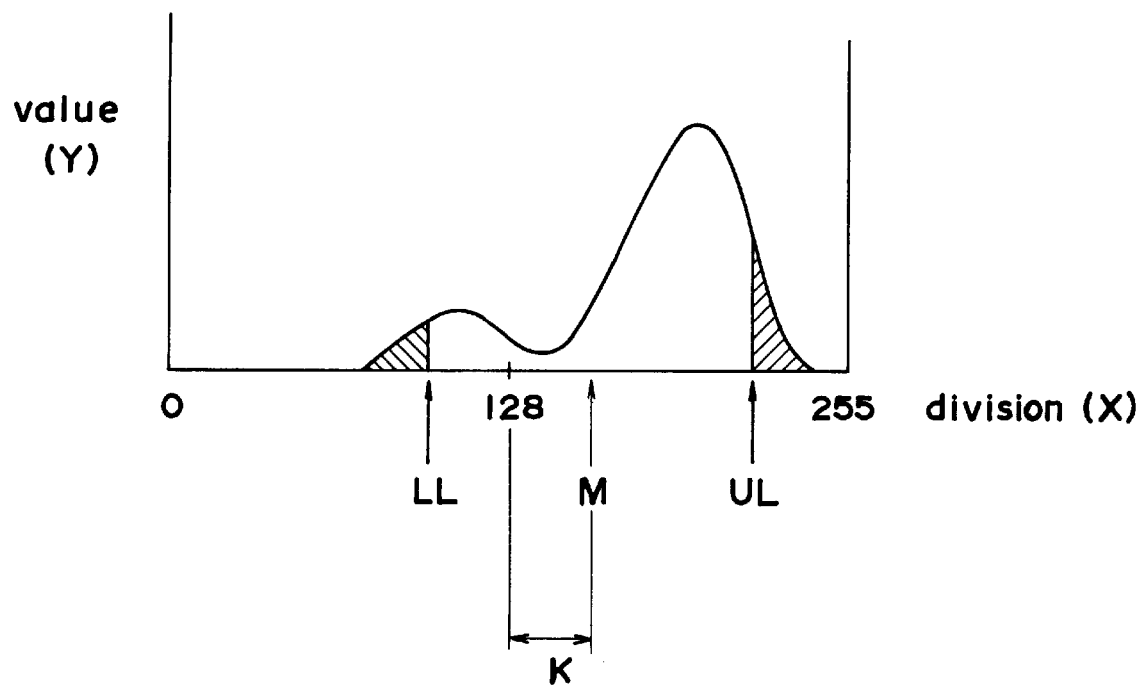
FIG. 7 is an illustration furthering the description of FIG. 6.

First, the level value LL at which the cumulative frequency from a level at the bottom of the histogram becomes a predetermined value A, and a level value UL at which the cumulative frequency from the top of the histogram becomes a predetermined value B are determined (refer to FIG. 7). The values A and B are suitably set beforehand at, for example, single values among the 256 values of all frequencies. Steps S11 through S16 in FIG. 6 are the process for determining level LL, and steps S17 through S22 are the process for determining level UL. First, [0] is substituted at level X (step S11) and the frequency of level [0] is designated Y (step S12), then the value of level X is increased by [1] (step S13), and the value of the frequency of level X is added to the previous value Y to obtain an updated value Y (step S14). Then, a determination is made as to whether or not value Y is larger than value A (step S15). If the determination is NO, the routine returns to step S13, whereas if the determination is YES, the current value X is designated LL (step S16). Subsequently, 255 is substituted for level X (step S17) and the frequency of level 255 is designated Y (step S18), then the value of level X is decreased by [1] (step S19), and the value of the frequency of level X is added to the previous value Y to obtain an updated value Y (step S20). Then, a determination is made as to whether or not value Y is larger than value B (step S21). If the determination is NO, the routine returns to step S19, whereas if the determination is YES, the current value X is designated UL (step S22).

When the values of levels LL and UL are determined, the value obtained by the equation $$(LL+UL)/2-128$$

is designated value K (step S23). This value K indicates whether or not the center of the histogram (M=(LL+UL)/2) is biased to the right side compared to the threshold value (128). If K>0, it is determined that the film is dark because the value K is biased to the right side, such that lamp 3 is brightened. If K<0, the it is determined that the film is bright because the value K is biased to the left, such that the lamp 3 is darkened. The specific exposure amount of lamp 3 is determined using a table of exposure amounts (%) corresponding to values of K (step S24). This table is created beforehand through experiments, so as to optimize the exposure amount used in the main scan relative to the density of the document, i.e., degree of brightness (K value) of the document. This table is stored in ROM 12. An example of such a table is shown in FIG. 8. For example, in the table of FIG. 8, when k=15 the exposure amount is 75% by proportional distribution. When the exposure amount of the main scan is determined, CPU 8 specifies a voltage ratio exposure amount (%)) for lamp power source 7 so as to set the exposure amount of lamp 3 (step S25). The voltage output by lamp power source 7 is set based on the set exposure amount, and the output is changed to said set voltage to light lamp 3.

When the main scan exposure amount is set, CPU 8 sets the wait time for starting the main scan in step S3. That is, when the main scan exposure amount has been set in step S2, there is a waiting period until the brightness of lamp 3 is stabilized, and the wait time until such stability is attained is determined using a wait time table corresponding to the exposure amount. An example of such a table is shown in FIG. 9. This table is also generated beforehand by experiment, and stored in ROM 12. For example, according to the table of FIG. 9, the wait time is 0.2 seconds when the exposure amount is 50%.

The method of determining the wait time is not limited to methods using tables, e.g., the wait time may be approximated using specific functions without the use of a table. For example, if the prescan exposure amount is 70%, the wait time can be calculated by the equation below.

$$\text{Wait time (seconds)}=|\text{exposure amount }(\%)-70|\times 0.01$$

Figure 10:
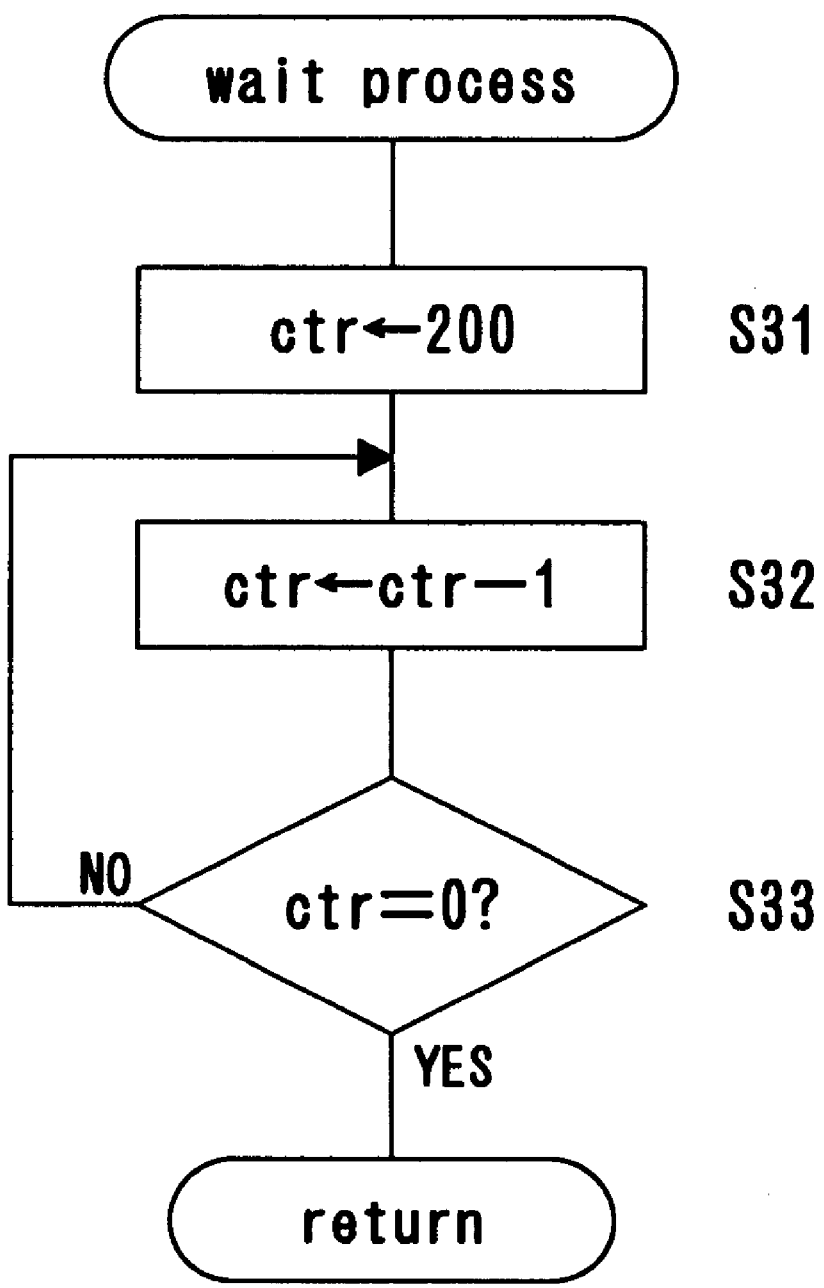
FIG. 10 is a flow chart showing the wait process of FIG. 4.

When the wait time has been determined, then in step S4, CPU 8 executes the wait process. That is, when the wait time has been determined in step S3, an internal timer or the like built in CPU 8 counts the wait time. For example, the CPU's internal timer produces an interrupt request every 1 millisecond. A so-called ctr variable may be prepared beforehand, such that the ctr value is decreased by [1] each time the interrupt routine is called (i.e., each 1 millisecond). For example, when the wait time is 0.2 seconds, a value of 200 is substituted for the ctr value in the main routine, and the attainment of a ctr value of [0] is awaited. When the ctr value reaches [0], the interrupt routine has been called 200 times, and 200 milliseconds (0.2 sec) have elapsed. This is expressed in the flow chart of FIG. 10. The main routine (steps S31 and S33) and the interrupt routine (step S32) are combined in the drawings.

When the wait time has elapsed, the brightness of lamp 3 has stabilized, and the main scan is executed in step S5. That is, image scanning is accomplished by scanning mirror 5, the output voltage of CCD line sensor 6 is digitized by A/D converter 9, and the digitized image data are subjected to image processing (e.g., edge highlighting process, masking process, binarization process and the like) by image processing unit 10, and output to an external device (e.g., laser beam printer, recording device or the like).

Accordingly, the present invention determines an exposure amount of a main scan based on a histogram (image density data) obtained by a prescan, and delays the start of the main scan in accordance with said determined exposure amount, thus changing the wait time to correspond to the exposure amount, and thereby reducing the wait time when there is only slight change in the exposure amounts of the prescan and the main scan. Thus, the total reading time can be reduced.

The previously described embodiment provides that since the wait time is counted by the CPU's internal timer in accordance with a determined exposure amount, it is not necessary to provide separate exposure change measuring means as in conventional devices, thereby eliminating an increase in the number of components and concomitant rise in cost.

Although the present invention has been described by way of an example of a microfilm reader/scanner, it is to be understood that the present invention is also applicable to film scanners which read images recorded on film without a reader optical unit, and scanners which electrically read document via the reception of light reflected from said document.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed:

1. An image scanner executing a prescan of a document image to obtain optimum image reading parameter for a main scan, comprising:

a light source for illuminating a document set exposure amount, photoelectric conversion device for receiving reflected light from the document illuminated by said light source and outputting electric signals corresponding to reflected light;

a density detection unit for outputting document density information based on the electric signals output from said photoelectric conversion device;

an exposure amount control unit for setting an exposure amount for the main scan in accordance with the document density information so as to change the exposure amount of said light source; and a delay control unit for setting a wait time from the end of the prescan until a start of the main scan in accordance with the exposure amount determined by said exposure amount control unit.

2. The image scanner as claimed in claim 1, wherein the prescan is accomplished with a predetermined exposure amount set beforehand.

3. The image scanner as claimed in claim 1, wherein the exposure amount control unit stores a table showing a relationship between the document density information and the exposure amount for the main scan.

4. The image scanner as claimed in claim 1, wherein the delay control unit stores a table showing the relationship between exposure amount and waiting times corresponding to said exposure amount for the main scan.

5. The image scanner as claimed in claim 1, wherein the exposure amount control unit stores a functional equation to determine the exposure amount for the main scan from the document density information.

6. The image scanner as claimed in claim 1, wherein the delay control unit stores a functional equation to determine the wait time from the exposure amount for the main scan.

7. The image scanner as claimed in claim 1, wherein the light source is desirably changed to the exposure amount set for the main scan without being turned OFF after the prescan.

8. The image scanner as claimed in claim 1, wherein said light source has a light-emitting lamp and a power source for supplying power to said lamp, such that the exposure amount of the lamp can be controlled by controlling a voltage from said power source.

9. The image scanner as claimed in claim 1, wherein the density detection unit detects image density by generating a histogram of an accumulation of each level of brightness of image signals output from the photoelectric conversion device during a prescan.

10. A microfilm reader/scanner comprising:

a reader optical unit for projecting a document image recorded on film onto a screen;

a scanning optical unit for reading said document image and converting the read image to electric signals;

a light source which illuminates a document image recorded on a film;

mirror for bending light reflected from the document to said reader optical unit and said scanner optical unit;

photoelectric conversion device for receiving the reflected light of the document image illuminated by said light source and outputting electric signals corresponding to the reflected light; and a controller for detecting a document density based on the electric signals output from said photoelectric conversion device during a prescan, determining an exposure amount for a main scan in accordance with the detected document density, setting an exposure amount of the light source in conjunction therewith, and setting a wait time after the prescan in accordance with the exposure amount of the main scan before starting said main scan.

11. The microfilm reader/scanner as claimed in claim 10 wherein the photoelectric conversion device includes a CCD line sensor.

12. The microfilm reader/scanner as claimed in claim 10 wherein the prescan is accomplished with a predetermined set exposure amount.

13. The microfilm reader/scanner as claimed in claim 10 wherein the light source is desirably changed to the exposure amount for the main scan without being turned OFF after the prescan.

14. An image reading method which executes a prescan prior to a main scan for reading a document image, said image reading method comprising:

conducting a prescan of a document by illuminating the document via a predetermined prescan exposure amount and detecting a density of said document;

determining a main scan exposure amount for the main scan for illuminating the document in accordance with the detected document density;

determining a wait time for delaying a start of the main scan in accordance with the determined main scan exposure amount; and starting the main scan after waiting the determined wait time.

15. The image reading method as claimed in claim 14, further comprising a step of modifying power supplied to a scanning light source to change the main scan exposure amount.

* * * * *